United States Patent

Halinski et al.

[15] 3,662,192
[45] May 9, 1972

[54] FREQUENCY-SENSITIVE TRIGGERING TECHNIQUES

[72] Inventors: Michael J. Halinski, Arlington Heights; Larry J. Wanschek, Chicago, both of Ill.

[73] Assignee: Sun Electric Corporation

[22] Filed: Apr. 14, 1969

[21] Appl. No.: 815,794

[52] U.S. Cl. ..........................307/293, 307/252 J, 307/301, 328/67, 307/246
[51] Int. Cl. ......................................................H03k 17/26
[58] Field of Search ........................307/293, 252, 301, 214; 337/151

[56] References Cited

UNITED STATES PATENTS

| | | | |
|---|---|---|---|
| 2,877,401 | 3/1959 | Hansburg | 307/293 |
| 2,891,172 | 6/1959 | Bruce | 307/214 |
| 3,085,165 | 4/1963 | Schaffert | 307/301 |
| 3,334,243 | 8/1967 | Cooper | 307/252 |

*Primary Examiner*—Donald D. Forrer
*Assistant Examiner*—David M. Carter
*Attorney*—Molinaire, Allegretti, Newitt & Witcoff

[57] ABSTRACT

A reliable trigger signal may be produced from a periodic electrical signal having several voltage peaks in each cycle by providing a controlled rectifier that is switched to its conductive state by the receipt of one of the voltage peaks. The switching of the controlled rectifier energizes a signal generator that returns the controlled rectifier to its nonconductive state only after the occurrence of all voltage peaks in each cycle. As a result, only one trigger signal is produced in each cycle. The signal generator is controlled by a timing circuit that is charged to a progressively higher voltage as the cyclical repetition rate of the periodic electrical signal increases, thereby decreasing the time in each cycle in which the controlled rectifier conducts.

9 Claims, 3 Drawing Figures

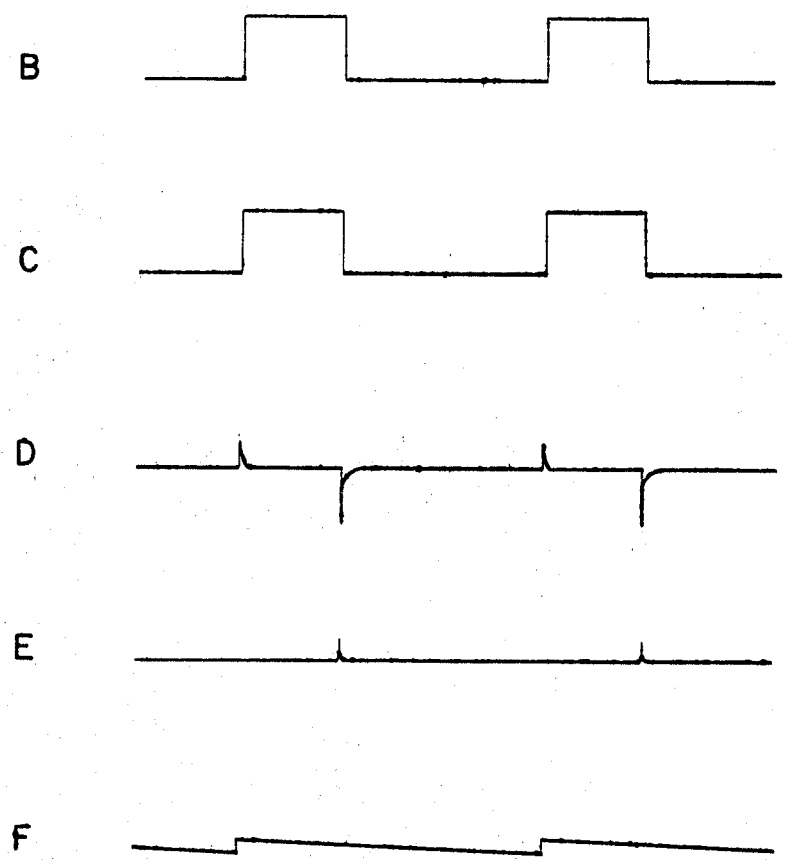

FREQUENCY-SENSITIVE TRIGGERING TECHNIQUES

BACKGROUND OF THE INVENTION

This invention relates to electrical circuits having a variable timing feature, and more specifically relates to frequency sensitive trigger apparatus for use in connection with an oscilloscope.

In recent years, the automotive maintenance industry has increasingly turned to the use of automotive oscilloscopes in order to properly analyze automotive ignition systems. Although a number of automotive oscilloscopes have been designed for this purpose, each has exhibited certain deficiencies that have limited its usefulness. A primary difficulty experienced in the use of such oscilloscopes has been the manner in which the devices have been triggered. Automobile mechanics appreciate the fact that a stable wave form is produced on an automotive oscilloscope only when the sweep generator thereof is triggered no more than once during each cycle of the automotive ignition signal being analyzed. If more than one trigger signal is provided per cycle, or if the trigger signal for some reason shifts from one part of the signal to another during successive cycles, a shifting and unstable wave form results. This wave form is extremely difficult to read, and makes accurate analysis impossible.

Production of the undesired trigger signals described above is frequently caused by the nature of the ignition signal itself. For example, the analysis of an automobile engine containing fouled or dirty sparkplugs frequently results in an ignition signal that contains numerous voltage peaks in each cycle. These spurious voltage peaks generally occur between the time the ignition points of the automobile are opened and closed (i.e., about the time that each sparkplug is fired). When a signal of the foregoing type is applied to an oscilloscope, the horizontal sweep generator thereof tends to be triggered by several of the voltage peaks in each cycle so that an unstable wave form is produced. This difficulty is compounded by the fact that the phase relationship of the voltage peaks and the cyclical repetition rate of the ignition signal changes as the mechanic varies the engine speed. As a result, the wave form of the oscilloscope almost constantly varies so that careful analysis by the mechanic is difficult, if not impossible.

SUMMARY OF THE INVENTION

In order to overcome the deficiencies of the prior art devices, applicants have devised a method of switching a gate device to its conductive or nonconductive state in response to one of the voltage peaks of a periodic signal being analyzed. The switching produces a trigger signal that is conducted to an oscilloscope displaying the periodic signal. Thereafter the gate device is insensitive to subsequent voltage peaks until it is reswitched to its original state. The time period prior to reswitching is made coextensive with the duration of the voltage peaks in each cycle, so that the oscilloscope receives only one trigger signal per cycle of the periodic signal. The resulting oscilloscope wave form is stable and steady so that a mechanic may analyze it in detail.

As one means of implementing the foregoing method, the present invention provides for a gate means that produces a trigger signal by changing its conductive state in response to a voltage peak of the periodic signal; a signal generator that produces a switching signal within a predetermined time period after the production of the trigger signal; means for reswitching the gate means to its opposite conductive state in response to the switching signal; and timing means that adjusts the duration of the time period as the cyclical repetition rate of the periodic signal changes.

Although the present invention has many uses, it is particularly useful in connection with an oscilloscope that displays ignition signals produced by an automobile engine. In this embodiment of the invention, the production of the switching signal by the signal generator is automatically adjusted and controlled by the timing means.

At slow engine speeds, the duration of the voltage peaks is relatively long and the timing means is arranged so that the time period needed to produce the switching signal (which is coextensive with the conductive period of the gate means) is correspondingly long. As the engine speed is increased, the duration of the voltage peaks is reduced and the time needed to produce the switching signal is automatically reduced proportionately by the timing circuit. As a result, an appropriate trigger signal is provided at any desired engine speed without adjustment by the mechanic.

From the foregoing discussion, it will be appreciated that the present invention comprises a unique circuit arrangement that automatically compensates for variations in the rate of the periodic signal being analyzed. As a result, the gate means remains conductive for the precise period of time needed to protect the oscilloscope from the effects of various voltage peaks in the periodic signal without resetting the invention at each separate signal rate.

Use of the above-described invention in the manner indicated results in an oscilloscope wave form that is completely stable and reliable. Accordingly, a mechanic using the oscilloscope in connection with the present invention is able to analyze a periodic signal with a degree of accuracy, speed, and reliability heretofore unattainable.

DESCRIPTION OF THE DRAWINGS

These and other advantages and features of the present invention will hereinafter appear for purposes of illustration, but not of limitation, in connection with the accompanying drawings in which:

FIG. 2 is an illustration of an exemplary ignition voltage wave form; and

FIG. 3 illustrates voltage wave forms produced by the circuit shown in FIG. 1 at the positions in the circuit identified by the corresponding letters thereof.

DESCRIPTION OF THE PREFERRED EMBODIMENT

Figure 1:
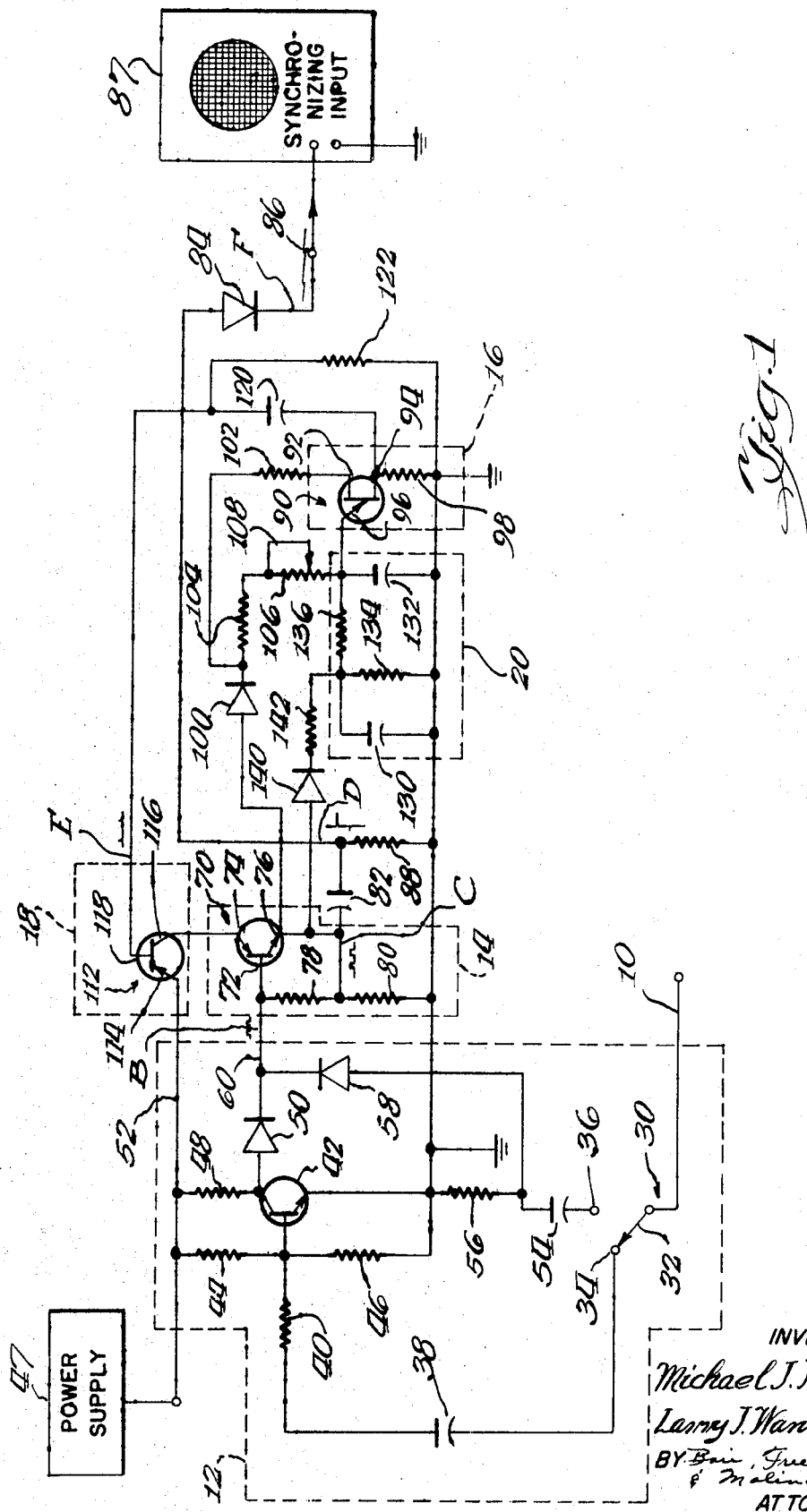
FIG. 1 is a schematic diagram of a preferred form of apparatus made in accordance with the present invention.

Referring to FIG. 1, a preferred form of apparatus made in accordance with the present invention basically comprises an input conductor 10, a control circuit 12, a gate circuit 14, a signal generator 16, a variable resistance device 18, and a timing circuit 20.

In the preferred embodiment of the invention, input conductor 10 is connected to the distributor points of an automobile ignition system that is to be analyzed. An exemplary ignition signal received from a typical test vehicle is illustrated in FIG. 2. As shown in FIG. 2, the wave form of the signal includes a peak identified by the letter $x$ that is caused by the opening of the distributor points. The wave form also includes voltage peaks identified by the letters $y$ and $z$ that also typically occur during each cycle of the signal.

As shown in FIG. 1, control circuit 12 comprises a switch 30 that has a contact arm 32 connected to input conductor 10. Switch 30 also comprises terminals 34 and 36 between which arm 32 may be moved. Terminal 34 is connected over a capacitor 38 and a resistor 40 to the base of a transistor 42. Bias current is supplied to the base by resistors 44 and 46. The collector of transistor 42 is supplied with current from a power supply 47 and a positive voltage supply conductor 52 through a resistor 48. The collector of transistor 42 is also connected over a diode 50 to a conductor 60, and the emitter of transistor 42 is connected to ground potential. Terminal 36 of switch 30 is connected over a capacitor 54 and a diode 58 to conductor 60. Capacitor 54 is also connected to ground potential through a resistor 56.

Gate circuit 14 basically comprises a silicon controlled rectifier 70 having a gate electrode 72 that is connected to conductor 60. The controlled rectifier also has a current path extending from an anode electrode 74 to a cathode electrode 76. Resistors 78 and 80 are used to properly control the operation of gate electrode 72. Cathode electrode 76 is connected over a capacitor 82 and a diode 84 to an output terminal 86. Output terminal 86 is connected to the synchronizing input of an oscilloscope 87. As shown in FIG. 1, one side of capacitor 82 is connected over resistor 80 to ground potential, and the opposite side of capacitor 82 is connected over a resistor 88 to ground potential.

Signal generator 16 basically comprises a unijunction transistor 90 having a transconductive path extending between a base-two electrode 92 and a base-one electrode 94. Transistor 90 also includes an emitter electrode 96. Base-one electrode 94 is connected to ground potential through a resistor 98.

Base-two electrode 92 of signal generator 16 is connected to cathode electrode 76 of gate circuit 14 over a current path that includes a diode 100 and a resistor 102. Emitter electrode 96 of signal generator 16 is connected to cathode electrode 76 of gate circuit 14 over another circuit path that includes diode 100, a resistor 104, and an adjustable resistor 106. Adjustable resistor 106 also includes a manually variable adjusting arm 108.

Variable resistance device 18 comprises a transistor 112 having an emitter electrode 114 connected to supply conductor 52, a collector electrode 116 connected to anode electrode 74 of gate circuit 14, and a base electrode 118 that is connected over a capacitor 120 to base-one electrode 94 of signal generator 16. Base electrode 118 is also connected to ground potential over a resistor 122.

Timing circuit 20 comprises capacitors 130 and 132 and resistors 134 and 136 that are connected in the manner shown in FIG. 1. Capacitor 130 is connected to cathode electrode 76 of gate circuit 14 over a diode 140 and a resistor 142.

The method aspect of the present invention will now be described in connection with the apparatus shown in FIG. 1. It is assumed that input conductor 10 is connected to the distributor points of an automobile in the manner previously described. When the apparatus of FIG. 1 is connected in the manner indicated, the voltage wave form conducted to input conductor 10 may be analyzed by a mechanic using the oscilloscope. In order to operate the apparatus, control circuit 12 is adjusted in order to apply positive-going voltage pulses to conductor 60. If positive-going pulses are conducted to input conductor 10, this result may be conveniently achieved by moving contact arm 32 into contact with terminal 36. The positive-going pulses are then conducted over capacitor 54 and diode 58 to conductor 60. Likewise, if predominantly negative-going pulses are applied to input conductor 10, contact arm 32 is moved into contact with terminal 34. The negative-going pulses are then phase inverted through transistor 42 into positive-going pulses that are applied through diode 50 to conductor 60. Accordingly, the unique design of control circuit 12 provides an inexpensive and convenient means for the mechanic to properly adjust the circuit for almost any type of periodic wave form that my be encountered.

Transistor 112 is normally conductive so that a source of current is available for controlled rectifier 70. Rectifier 70, in turn, is normally nonconductive. When positive voltage peak $x$ (FIG. 2) is conducted to gate electrode 72, controlled rectifier 70 is switched from its nonconductive to its conductive state so that current is drawn from positive voltage supply conductor 52 through the emitter-base junction of transistor 112, the current path of controlled rectifier 70, and resistor 80 to ground potential. As a result, the voltage at cathode electrode 76 immediately increases in the manner indicated by wave form C of FIG. 4 in order to produce a squarewave signal. The squarewave signal is differentiated by capacitor 82 and the resulting, positive-going trigger signal is conducted through diode 84 and output terminal 86 to the oscilloscope. Diode 84 isolates capacitor 82 and prevents it from being charged by external circuitry. Applicants have found that a controlled rectifier is particularly well suited for use in gate means 14, and that it provides a clean square signal that is easy to control.

After controlled rectifier 70 is switched to its conductive state, (thereby producing a trigger signal) the rectifier remains in its conductive state and continues to draw current through transistor 112. As a result, the presence of additional voltage peaks (such as peaks $y$ and $z$ in the wave form shown in FIG. 2) have no effect when impressed on gate electrode 72. Accordingly, these voltage peaks are prevented from reaching the synchronizing input of the oscilloscope so that the horizontal sweep generator thereof continues to function in a normal manner without being retriggered.

As soon as controlled rectifier 70 is switched to its conductive state, the increased voltage at cathode electrode 76 is carried through diode 100 and resistor 102 to base-two electrode 92. Simultaneously, the same voltage is conducted through diode 100 and resistors 104, 106 to emitter electrode 96. As a result, capacitor 132 is charged until the intrinsic stand-off ratio of transistor 90 is reached, thereby causing the transconductive path and the emitter circuit of the transistor to become conductive. When the emitter circuit becomes conductive, the voltage across resistor 98 rapidly increases so that a switching signal comprising a positive pulse of voltage is conducted through capacitor 120 to base 118 of transistor 112, thereby causing the transistor to momentarily switch to its non-conductive state. When transistor 112 is switched in the manner indicated, the current flow through controlled rectifier 70 is interrupted, and the rectifier is reswitched to its non-conductive state.

Those skilled in the art will appreciate that a unijunction transistor is an ideal component for use in a circuit having the operaing characteristics described above. The unijunction transistor may be conveniently temperature compensated by using an appropriate resistor 102, and the intrinsic stand-off ratio may be set to a variety of voltage levels. In addition, the time required in order to charge capacitor 132 to the intrinsic stand-off ratio is easily adjusted by moving arm 108.

In order to adjust the apparatus shown in FIG. 1, the engine of the vehicle being analyzed is reduced to idle speed and adjusting arm 108 of resistor 106 is manually altered until the duration of the time period during which controlled rectifier 70 is in its conductive state approximately equals the time period between the voltage peaks indicated by the letter T in FIG. 2.

When the engine speed increases, the cyclical repetition rate of the ignition signal also increases, and the duration of the voltage peaks decreases accordingly. Under these conditions, the duration of the time conduction period of the controlled rectifier eventually becomes too long if the duration set at engine idle speed is maintained. That is, the conduction time period of the controlled rectifier becomes longer than the time between each cycle of the ignition signal. Accordingly, timing circuit 20 provides a means for automatically decreasing the conduction time period of the controlled rectifier as the engine speed increases. This result is achieved through the unique arrangement of diode 140, capacitor 130, and resistors 134, 136, and 142. This portion of the apparatus (shown in FIG. 1) operates as follows. When the engine of the test vehicle is idling, controlled rectifier 70 is switched at a relatively slow rate so that the average voltage maintained across capacitor 130 has a relatively low value. Since capacitor 130 is joined to capacitor 132 through resistor 136, capacitor 132 is also maintained at a relatively low average voltage. As a result, a relatively long period of time is required for capacitor 132 to charge to the intrinsic stand-off ratio of transistor 90, and the time period required to produce a switching signal from the transistor is relatively long. However, as the engine speed of the test vehicle increases, controlled rectifier 70 is switched at a more rapid rate so that charging current is frequently applied to capacitor 130. In this mode of operation, capacitors 130 and 132 are charged to a relatively higher voltage. As a result, the period of time required in order to charge capacitor 132 to the intrinsic stand-off ratio of transistor 90 is reduced, and the duration of the conduction time period of controlled rectifier 70 is decreased accordingly. In summary, timing circuit 20 provides a means for automatically decreasing the duration of the conduction time period of controlled rectifier 70 as the cyclical repetition rate of the ignition signal increases. This mode of operation provides a completely automatic system (once resistor 106 is initially adjusted) so that the mechanic may analyze the wave form of the ignition signal at any desired engine speed.

It should be noted that the apparatus illustrated in FIG. 1 is merely an example of the preferred form of the invention, and that various changes in the apparatus and mode of operation may be effected without departing from the spirit and scope thereof.

What is claimed is:

1. Apparatus for producing a trigger signal in response to a periodic electrical signal that may have more than one voltage peak in each cycle, said apparatus comprising:

input means for receiving said periodic electrical signal;

gate means operatively connected to said input means, said gate means having a conductive state and a nonconductive state;

circuit means for conducting said periodic electrical signal to said gate means so that said gate means is switched to one of its states in response to a first voltage peak in said periodic electrical signal whereby a trigger signal is produced;

first means for conducting said trigger signal to an output terminal;

a signal generator for producing a switching signal within a predetermined time period after the production of said trigger signal;

second means connected to said gate means for reswitching said gate means to its other said state in response to said switching signal; and timing means connected between said signal generator and said gate means for automatically substantially decreasing the duration of said time period as the cyclical repetition rate of said periodic electrical signal increases.

2. Apparatus, as claimed in claim 1, wherein said circuit means comprises:

a switch connected to the input means;

inverter means connected between said switch and said gate means for inverting the phase of said periodic electrical signal; and means connected between said switch and said inverter means for applying said periodic electrical signal to said inverter means without phase inversion.

3. Apparatus, as claimed in claim 1, wherein said first means comprises a capacitor and a diode connected in series between said output terminal and said gate means.

4. Apparatus, as claimed in claim 1, wherein said timing means comprises a capacitive-resistive circuit that is periodically charged by the conduction of said gate means so that the average voltage charged across said capacitve-resistive circuit increases as the cyclical repetition rate of the periodic electrical signal increases.

5. Apparatus, as claimed in claim 4, wherein said timing means further comprises manually operated adjustment means for initially adjusting the duration of said time period.

6. Apparatus, as claimed in claim 1, wherein said timing means comprises at least two capacitors connected in parallel between said gate means and said signal generator and a resistor connected between said two capacitors.

7. Apparatus, as claimed in claim 6, wherein said timing means further comprises a diode connected between said gate means and said capacitors.

8. Apparatus, as claimed in claim 2, wherein said invertor means comprises an emitter and a base and where said means connected between said switch and said inverter means comprises a first circuit means for conducting a signal from said switch to said base and a second circuit means for conducting a signal from said switch to said emitter.

9. A method of triggering an oscilloscope that displays a periodic electrical signal having more than one voltage peak in each cycle thereof by means of a gating device having a conductive state and a nonconductive state, said method comprising the steps of:

switching the gating device to one of its states in response to a first voltage peak in each cycle of the periodic electrical signal so that a trigger signal is produced;

conducting the trigger signal to the oscilloscope;

holding the gating device in said state so that subsequent voltage peaks in said cycle have no effect thereon;

reswitching the gating device to its other said state with in a predetermined time period after the production of said trigger signal; and substantially decreasing said time period as the cyclical repetition rate of said periodic electrical signal increases.

* * * * *